(12) United States Patent
Wang et al.

(10) Patent No.: US 12,302,257 B2
(45) Date of Patent: May 13, 2025

(54) ASSET-TRACKING SYSTEM (71) Applicant: SIGNIFY HOLDING B.V., Eindhoven (NL)

(72) Inventors: Xiangyu Wang, Eindhoven (NL); Armand Michel Marie Lelkens, Heerlen (NL); Octavio Alejandro Santana Arnaiz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 126 days.

(21) Appl. No.: 18/024,310

(22) PCT Filed: Aug. 3, 2021

(86) PCT No.: PCT/EP2021/071661
§ 371 (c)(1),
(2) Date: Mar. 2, 2023

(87) PCT Pub. No.: WO2022/048844
PCT Pub. Date: Mar. 10, 2022

(65) Prior Publication Data
US 2023/0247565 A1 Aug. 3, 2023

(30) Foreign Application Priority Data
Sep. 3, 2020 (EP) .................................. 20194226

(51) Int. Cl.
H04W 52/24 (2009.01)
G01S 13/75 (2006.01)
G06K 19/07 (2006.01)

(52) U.S. Cl.
CPC ......... *H04W 52/245* (2013.01); *G01S 13/751* (2013.01); *G06K 19/0712* (2013.01); *H04W 52/241* (2013.01)

(58) Field of Classification Search
CPC . H04W 52/245; H04W 52/241; G01S 13/751; G06K 19/0712
USPC ........................................................ 340/10.1
See application file for complete search history.

(56) References Cited

U.S. PATENT DOCUMENTS

| 5,317,309 | A | * | 5/1994 | Vercellotti | ............ | G01S 13/825 340/10.5 |
| 6,940,392 | B2 | * | 9/2005 | Chan | ..................... | G01S 5/0009 375/146 |
| 7,705,736 | B1 | * | 4/2010 | Kedziora | ............. | A01K 27/009 340/573.3 |
| 9,113,464 | B2 | * | 8/2015 | Hirt | ....................... | H04W 12/04 |

(Continued)

Primary Examiner — Brian A Zimmerman
Assistant Examiner — Thang D Tran (57) ABSTRACT The invention provides a target tag (10) for object tracking, wherein the target tag (10) is configured to detect listener beacon signals emitted by a plurality of listener nodes (110), wherein the target tag (10) has access to transmission power-related data and receiver sensitivity-related data of the plurality of listener nodes (110), and wherein in a tag operational mode the target tag (10) is configured to: detect the listener beacon signals and to determine related listener beacon signal strengths; determine a tag transmission power based on the related listener beacon signal strengths, the transmission power-related data, the receiver sensitivity-related data, and a predetermined goal number of reached listener nodes; and emit the target beacon signal at the tag transmission power.

12 Claims, 3 Drawing Sheets (56) References Cited

U.S. PATENT DOCUMENTS

| | | | |
|---|---|---|---|
| 10,484,820 B2 | 11/2019 | Skaaksrud | |
| 2007/0013481 A1 | 1/2007 | Zhu et al. | |
| 2008/0150688 A1* | 6/2008 | Burr | H01P 5/08 340/10.1 |
| 2008/0220803 A1* | 9/2008 | Lee | H04W 52/52 455/522 |
| 2008/0224870 A1 | 9/2008 | Yeo et al. | |
| 2010/0098036 A1 | 4/2010 | Li | |
| 2010/0201520 A1 | 8/2010 | Stern et al. | |
| 2011/0080267 A1* | 4/2011 | Clare | G06K 7/0008 340/10.4 |
| 2011/0128129 A1* | 6/2011 | Graczyk | G06K 19/0728 340/10.33 |
| 2012/0218101 A1* | 8/2012 | Ford | G01S 1/7032 340/8.1 |
| 2013/0278305 A1* | 10/2013 | Kim | G01R 31/2822 327/141 |
| 2013/0307420 A1 | 11/2013 | Yoder et al. | |
| 2013/0337847 A1* | 12/2013 | Sridhara | H04W 64/00 455/456.6 |
| 2014/0300747 A1* | 10/2014 | Krishnakumar | H04N 23/60 348/164 |
| 2014/0341128 A1* | 11/2014 | Turtinen | H04W 48/12 370/329 |
| 2015/0105099 A1* | 4/2015 | Luo | H04W 64/00 455/456.1 |
| 2015/0133062 A1* | 5/2015 | Mrvaljevic | H04W 24/00 455/67.13 |
| 2016/0007315 A1* | 1/2016 | Lundgreen | G01S 3/46 455/67.11 |
| 2016/0295362 A1* | 10/2016 | Ronse | H04W 64/00 |
| 2017/0339733 A1* | 11/2017 | Kurian | H04W 76/23 |
| 2017/0347359 A1* | 11/2017 | Yang | H04W 52/24 |
| 2018/0074161 A1* | 3/2018 | Rosenbaum | G01S 11/04 |
| 2019/0277937 A1* | 9/2019 | Li | G01S 5/0236 |
| 2020/0022204 A1* | 1/2020 | Husted | H04W 28/0268 |
| 2020/0154246 A1* | 5/2020 | Ganz | H04W 4/80 |
| 2020/0193785 A1* | 6/2020 | Berglund | H04W 4/35 |
| 2022/0268875 A1* | 8/2022 | Szebenyei | G01S 13/74 |

* cited by examiner

ASSET-TRACKING SYSTEM

CROSS-REFERENCE TO PRIOR APPLICATIONS

This application is the U.S. National Phase application under 35 U.S.C. § 371 of International Application No. PCT/EP2021/071661, filed on Aug. 3, 2021, which claims the benefit of European Patent Application No. 20194226.5, filed on Sep. 3, 2020. These applications are hereby incorporated by reference herein.

FIELD OF THE INVENTION

The invention relates to a target tag for object tracking. The invention further relates to an asset-tracking system. The invention further relates to a method for calibrating a tag. The invention further relates to a computer program product.

BACKGROUND OF THE INVENTION

Target tags are known in the art. For instance, US20080224870 describes an apparatus and method for managing power of a radio frequency identification (RFID) tag. It is possible for the apparatus for managing the power of the RFID tag to effectively reduce power consumption of the RFID tag by measuring the power strength of a radio frequency (RF) signal received from an RFID reader and adjusting a level of transmission power based on the measured power strength of the signal. Similarly, see also US2013/0337847A1.

SUMMARY OF THE INVENTION

Asset tracking systems may typically comprise three types of field devices: (mobile) tags, listener nodes (or "anchors"), and gateways. In such a system, the tags may emit beacon signals, and the listener nodes may detect incoming beacon signals sent by tags and conduct measurements such as signal strength measurements. Measurements may typically be conducted by multiple listener nodes and the listener nodes may send those results to a gateway from where they may be further processed, such as by further forwarding them to a positioning engine on a server or in the cloud. The listener nodes may be spatially distributed throughout a space in which the tag is to be tracked to provide good coverage of the space, and the tag may then be located based on signals from multiple listener nodes. For example, the position engine may estimate that the tag is closest to the listener node that recorded the highest signal strength with regards to the beacon signal. Typically, the beacon signal of a target tag may be picked up by a plurality of listener nodes, which may each report a related signal to the gateway, which requires some network capacity. Hence, in asset tracking systems, particularly those deployed with a dense lighting grid, and operating with a plurality of target tags, it may be challenging to provide enough network capacity to carry all measurement results, i.e., the network capacity needed could be very high if there is no meaningful reduction of communication.

Although it may be recognized that reduction of measurement data, hence reduction of network capacity needed, may not lead to significant reduction in performance, a good method for selection of listener nodes that need to report may not be easily available. In particular, listener nodes may be distributed in space and any coordination among them so that a few would be selected for reporting would require communication bandwidth overhead. If not designed carefully, the overhead might cost more than what is saved by listener nodes not reporting their measurement data. Further, target tags may be operated inefficiently with regards to energy expenditure, which may result in a short battery life of the target tag.

Hence, it is an aspect of the invention to provide an alternative asset-tracking system, which preferably further at least partly obviates one or more of above-described drawbacks. The present invention may have as object to overcome or ameliorate at least one of the disadvantages of the prior art, or to provide a useful alternative. The invention is set out in the appended set of independent and dependent claims.

Hence, in a first aspect, the invention may provide a target tag for object tracking. The target tag may be configured to detect listener beacon signals emitted by a plurality of listener nodes (of an asset-tracking system). The listener beacon signals may comprise one or more of transmission power-related data and receiver sensitivity-related data of the plurality of listener nodes. The target tag may further have access to the transmission power-related data and/or the receiver sensitivity-related data of the plurality of listener nodes, especially to transmission-power related data, or especially to receiver sensitivity-related data. The tag may further be operated in a tag operational mode. In the tag operational mode the target tag may be configured to execute one or more of a detection stage, a signal processing stage and an execution stage. In the detection stage, the target tag may (be configured to) detect the listener beacon signals (of the plurality of listener nodes) and may determine related listener beacon signal strengths and one or more of the transmission power-related data and the receiver sensitivity-related data. In the signal processing stage, the target tag may (be configured to) determine a tag transmission power based on one or more of the related listener beacon signal strengths, the transmission power-related data, the receiver sensitivity-related data, and a predetermined goal number of reached listener nodes. In the execution stage the target tag may (be configured to) emit the target beacon signal at the tag transmission power. Hence, in specific embodiments, the invention may provide a target tag for object tracking, wherein the target tag is configured to detect listener beacon signals emitted by a plurality of listener nodes, wherein the target tag has access to transmission power-related data and receiver sensitivity-related data of the plurality of listener nodes, and wherein in a tag operational mode the target tag is configured to: (i) detect the listener beacon signals and to determine related listener beacon signal strengths; (ii) determine a tag transmission power based on the related listener beacon signal strengths, the transmission power-related data, the receiver sensitivity-related data, and a predetermined goal number of reached listener nodes; and (iii) emit the target beacon signal at the tag transmission power.

The target tag may provide the benefit that the tag transmission power is adjusted on the basis of the (local) features of an asset-tracking system and a predetermined goal number of reached listener nodes.

In an asset tracking system, it is common that infrastructure listener nodes also periodically emit respective listener beacon signals. This may serve the purpose that mobile centric tags or mobile phones could use the listener beacon signals to determine their positions themselves to facilitate indoor navigation applications. The target tag of the invention may be configured to detect these listener beacon signals, and to determine an appropriate transmission power to reach a predetermined goal number of listener nodes based on the detected listener beacon signals. Hence, the transmission power of the target tag may be adjusted in order to (on average) reach a number of listener nodes that satisfies a desired localization accuracy, which may reduce excessive communication by the listener nodes as fewer listener nodes will have a related signal to report to the gateway and the overhead communication between listener nodes may be reduced, and which may improve the battery life of the target tag as the transmission power may be reduced. Hence, the invention may provide a target tag configured to make autonomous decisions about its transmission power by detecting and measuring listener beacon signals from listener nodes.

Hence, the invention may provide a target tag for object tracking, especially for tracking an object in a space.

The term "target tag" (also "tag") may herein refer to an item that may be tracked, especially a uniquely identifiable item, such as by being provided with a target tag identification. The target tag may especially be connected to a (larger) object that is desired to be tracked, such as attached to an item, or such as worn by a person. For example, the target tag may comprise one or more of a sticker, a badge, a wristband, an implant, and a token. Further, the target tag may be configured to emit a wireless signal, such as a radio beacon, or such as a Bluetooth low energy beacon. In general, the target tag may be a mobile target tag.

The term "space" may herein refer to any space in which it may be desirable to track the whereabouts of the target tag. The space may especially comprise a (part of) a building, such as (part of) a shopping mall, a factory or a hospital. The space may, however, also be located outside. The space may, for example, comprise a recreational park or a farm. In embodiments, the term "space" may refer to an office, a shop, a warehouse, a theater, a hospitality area, a hospital, an elderly home, a hotel, a plant, an airport, a shopping mall, a factory, and a horticulture plant. The term space may refer to an indoor space or an outdoor space, especially an indoor space. As will be clear to the person skilled in the art, in general, the space is not comprised by the asset-tracking system, i.e., the space is not part of the system.

In embodiments, the target tag may be configured to detect listener beacon signals emitted by a plurality of listener nodes, especially a plurality of listener nodes of an asset-tracking system.

In particular, the plurality of listener nodes may (be configured to) emit a listener beacon signal, especially to periodically emit a listener beacon signal. In particular, each listener node of the plurality of listener nodes may emit a (respective) listener beacon signal.

In further embodiments, the target tag may have access to transmission power-related data and/or receiver sensitivity-related data of the plurality of listener nodes, especially to transmission power-related data, or especially to receiver sensitivity-related data.

The term "transmission power-related data" may herein refer to data regarding the power with which the listener nodes transmit the listener beacon signals. In particular, with this data, the target tag may determine the loss in signal strength that occurred while a listener beacon signal travelled from the respective listener node to the target tag, which may (essentially) be the same signal strength loss that may be expected when the target beacon signal travels from the target tag to the respective listener node.

The term "receiver sensitivity-related data" may herein refer to data regarding the minimal signal strength that is required for the listener nodes to detect and/or process an incident signal, such as the target beacon signal. In particular, with this data, the target tag may determine the minimal signal strength that the target beacon signal may need to have when arriving at a listener node in order for the listener node to detect the target beacon signal and/or to report a related signal.

The transmission power-related data and the receiver sensitivity-related data may both relate to hardware and software. For example, the hardware of the listener node may imply that the listener node can only detect target beacon signals having a signal strength exceeding a threshold value (when arriving at the listener node). However, the listener node may further be configured to only report a related signal when the signal strength of a detected signal exceeds a second threshold value.

Hence, when the target tag has access to transmission power-related data, receiver sensitivity-related data, and the signal strengths of detected listener beacon signals, the target tag can—for each listener node—determine which transmission power would be required for the listener node to detect the target beacon signal (and to report a related signal).

The phrase "has access to data" and similar phrases may herein refer to (i) having default data, (ii) having specific data, (iii) receiving default data, and/or (iv) receiving specific data. Hence, in embodiments, the transmission power-related data may comprise default transmission power-related data. In further embodiments, the transmission power-related data may comprise specific transmission power-related data, i.e., transmission power-related data specific to one (or more) listener nodes of the plurality of listener nodes. In further embodiments, the target tag may comprise a data carrier on which the transmission power-related data is stored. In further embodiments, the target tag may (be configured to) receive the transmission power-related data during operation, such as in the operational mode, especially via the listener beacon signals.

For example, the target tag may comprise a data carrier on which default transmission power-related data is stored, which indicates that—by default—listener nodes are assumed to transmit the listener beacon signals at a power of 0 dBm. Hence, without further information, the target tag may, in the signal processing stage, determine the tag transmission power based on the assumption that the listener nodes emit at a power of 0 dBm. However, the listener nodes may, for example, emit a listener beacon signal comprising transmission power-related data. In particular, each listener beacon signal may comprise specific transmission power-related data regarding the power with which the (respective) listener beacon signal was emitted. Hence, in the example, the target tag detecting the listener beacon signals has access to specific transmission power-related data. In general, if the target tag has access to both default and specific transmission power-related data with regards to a listener node, the target tag will use the specific data in the signal processing stage. Hence, in the signal processing stage, the transmission-power related data may, for each listener node, be specific transmission power-related data if available, and default transmission power-related data if the specific transmission power-related data is unavailable.

Similarly, in the signal processing stage, the receiver sensitivity-related data may, for each listener node, be specific receiver sensitivity-related data if available, and default receiver sensitivity-related data if the specific receiver sensitivity-related data is unavailable.

In embodiments, the target tag may have a tag operational mode. The term "tag operational mode" especially refers to an operational mode of the tag. The term "operational mode" may also be indicated as "controlling mode". The target tag, system, or apparatus, or device (see further also below) may execute an action in a "mode" or "operational mode" or "mode of operation". Likewise, in a method an action, stage, or step may be executed in a "mode" or "operation mode" or "mode of operation". This does not exclude that the target tag, system, or apparatus, or device may also be adapted for providing another controlling mode, or a plurality of other controlling modes. Likewise, this does not exclude that before executing the mode and/or after executing the mode one or more other modes may be executed. However, in embodiments a control system (see further also below) may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a target tag, system, or apparatus, or device, that can only operate in a single operation mode (i.e. "on", without further tunability).

The tag operational mode may comprise one or more of a detection stage, a signal processing stage and an execution stage, especially the tag operational mode may comprise the detection stage, the signal processing stage and the execution stage.

In the detection stage, the target tag may (be configured to) detect the listener beacon signals (of the plurality of listener nodes) and to determine related listener beacon signal strengths. Specifically, the target tag may detect the listener beacon signals of (at least part of) the plurality of listener nodes and may, for each detected beacon signal, determine a related listener beacon signal strength.

The term "signal strength" may herein especially refer to the power present in the detected beacon signal. In particular, the signal strength may corresponding to a Received Signal Strength Indication (RSSI).

The term "related", such as in "related listener beacon signal strength" may herein refer to a relationship between two features, such as a relationship between a detected listener beacon signal and a determined related listener beacon signal strength, such as the related listener beacon signal strength (at least partially) being based on the (detection of) the listener beacon signal.

In the signal processing stage, the target tag may (be configured to) determine a tag transmission power based on the related listener beacon signal strengths, the transmission power-related data, the receiver sensitivity-related data, and a predetermined goal number of reached listener nodes.

The term "predetermined goal number" may herein refer to a goal number of listener nodes to detect the target beacon signal (and to report a related signal). The term "goal number" may herein refer to the respective number being a goal to be achieved, i.e., the target tag may be configured to (on average) reach a number of listener nodes that is as close as possible to the goal number. In further embodiments, the predetermined goal number may comprise a lower goal number, i.e., a desired minimum number of reached listener nodes. In further embodiments, the predetermined goal number may comprise an upper goal number, i.e., a desired maximum number of reached listener nodes. The term "predetermined goal number" may also refer to a plurality of predetermined goal numbers, such as a lower goal number and an upper goal number. Hence, the predetermined goal number may effectively provide an (acceptable) range of listener nodes to reach.

For example, the predetermined goal number may be 3 (lower goal number)-5 (upper goal number), and the target tag may, also based on the related listener beacon signal strengths, the transmission power-related data, and the receiver sensitivity-related data, determine a transmission power such that, based on the current information and at the current tag location, the target beacon signal would be detected by 3-5 listener nodes.

As an alternative to adjusting the tag transmission power, the target tag may also inform the plurality of listener nodes to adjust their desired threshold value for receiving and processing the target beacon signal.

Hence, the invention may provide a target tag for object tracking. The target tag may be configured to emit a target beacon signal. The target tag may further be configured to detect listener beacon signals emitted by a plurality of listener nodes. Especially, each of the plurality of listener nodes may be configured to detect the target beacon signal and to report a related target signal if a target signal strength of the target beacon signal exceeds a detection threshold. In embodiments, the target tag may have access to transmission power-related data and receiver sensitivity-related data of the plurality of listener nodes. The target tag may have an operational mode, especially wherein the operational mode comprises (execution of) one or more of a detection stage, a signal processing stage and an execution stage. The detection stage may comprise detecting the listener beacon signals and determining related listener beacon signal strengths. The signal processing stage may comprise determining a target beacon signal strength offset based on a predetermined goal number of reached listener nodes, the related listener beacon signal strengths, the transmission power-related data and the receiver sensitivity-related data. The signal processing stage may further comprise determining on the basis of the target beacon signal strength offset one or more of (a) a (first) transmission power of the target beacon signal and (b) a detection threshold value. The execution stage may comprise executing one or more of (a) emitting the target beacon signal at the (first) transmission power, and (b) informing at least part of the plurality of listener nodes to set the detection threshold (for the target tag) at the detection threshold value.

Hence, in specific embodiments, the target tag may be configured to emit a target beacon signal, and wherein the target tag is configured to detect listener beacon signals emitted by a plurality of listener nodes, and wherein each of the plurality of listener nodes is configured to detect the target beacon signal and to report a related target signal if a target signal strength of the target beacon signal exceeds a detection threshold, and wherein the target tag has access to transmission power-related data and receiver sensitivity-related data of the plurality of listener nodes, and wherein in an operational mode the target tag is configured to: detect the listener beacon signals and to determine related listener beacon signal strengths; determine a target beacon signal strength offset based on a predetermined goal number of reached listener nodes, the related listener beacon signal strengths, the transmission power-related data and the receiver sensitivity-related data; determine on the basis of the target beacon signal strength offset one or more of (a) a transmission power of the target beacon signal and (b) a detection threshold value; and execute one or more of (a) emitting the target beacon signal at the transmission power, and (b) informing at least part of the plurality of listener nodes to set the detection threshold at the detection threshold value.

Hence, rather than determining a tag transmission power with which the target tag would reach a desired number of listener nodes, the target tag may inform the plurality of listener nodes only to process the target beacon signal if the signal strength at which they receive it lies above a detection threshold value.

This may provide the further benefit that the target beacon signal may have a higher signal/noise ratio as the tag transmission power can be maintained at a higher level.

The term "detection threshold" may herein refer to a (software-level) threshold of the listener nodes, wherein the listener nodes are configured only to report a related target signal if a signal strength of a detected target beacon signal exceeds the detection threshold.

The target tag may especially inform the at least part of the plurality of listener nodes to set the detection threshold for the target tag at the detection threshold value, i.e., the detection threshold may remain unchanged for any other signals, such as for other beacon signals.

The term "target beacon signal strength offset" may herein especially refer to a signal strength difference that would result in the target tag reaching the predetermined goal number of reached listener nodes (based on the information presently available to the target tag). For instance, if the target beacon signal strength offset is −10 dBm, then either the tag transmission power could be reduced by 10 dBm, or the detection threshold value could be raised by 10, or a combination of the two may be performed to provide an overall difference of 10 dBm, such as reducing the tag transmission power by 5 dBm and raising the detection threshold value by 5 dBm.

In further embodiments, the signal processing stage may comprise determining on the basis of the target beacon signal strength offset a transmission power of the target beacon signal, and the execution stage may comprise emitting the target beacon signal at the transmission power.

In further embodiments, the signal processing stage may comprise determining on the basis of the target beacon signal strength offset a detection threshold value, and the execution stage may comprise informing at least part of the plurality of listener nodes to set the detection threshold at the detection threshold value.

A combination of adjusting the tag transmission power and adjusting the detection threshold value is also possible. In particular, the target tag could even increase its tag transmission power and increase the detection threshold value in order to provide a higher signal/noise ratio, while taking into account the predetermined goal number of n listener nodes.

In embodiments, the target beacon signal may comprise the detection threshold value, i.e., in embodiments, the target tag may be configured to (in the execution stage) inform the at least part of the plurality of listener nodes to set the detection threshold at the detection threshold value via the target beacon signal.

In embodiments, the invention may provide a target tag for object tracking, wherein the target tag is configured to detect listener beacon signals emitted by a plurality of listener nodes, wherein the target tag has access to transmission power-related data and receiver sensitivity-related data of the plurality of listener nodes, and wherein in a tag operational mode the target tag is configured to: detect the listener beacon signals and to determine related listener beacon signal strengths; determine a tag transmission power and/or a receiving signal strength threshold based on the related listener beacon signal strengths, the transmission power-related data, the receiver sensitivity-related data, and a predetermined goal number of reached listener nodes; and emit the target beacon signal at the tag transmission power and/or indicating in its target beacon signal the receiving signal strength threshold that is to be applied at the listeners when receiving (the target beacon signal). In particular, the operational mode may comprise determining a receiving signal strength threshold based on the related listener beacon signal strengths, the transmission power-related data, the receiver sensitivity-related data, and a predetermined goal number of reached listener nodes; and indicating in the target beacon signal the receiving signal strength threshold that is to be applied at the listeners when receiving.

In embodiments, the invention may provide a target tag for object tracking, wherein the target tag is configured to detect listener beacon signals emitted by a plurality of listener nodes, wherein the target tag has access to transmission power-related data and receiver sensitivity-related data of the plurality of listener nodes, and wherein in a tag operational mode the target tag is configured to: detect the listener beacon signals and to determine related listener beacon signal strengths; determine a (receiver) detection threshold range (for each listener node of the plurality of listener nodes) based on the related listener beacon signal strengths, the transmission power-related data, the receiver sensitivity-related data, and a predetermined goal number of reached listener nodes; and emit the target beacon signal comprising the detection threshold range, especially to at least part of the listener nodes of the plurality of listener nodes, more especially to each listener node of the plurality of listener nodes. In further embodiments, the target beacon signal, especially comprising the detection threshold range, may be arranged for enabling (each of) the listener nodes (of the plurality of listener nodes) to set a (respective) receiver sensitivity to the detection threshold range.

It will be clear to the person skilled in the art that the target tag may move (through the space) and that the number of listener nodes that detect a target beacon signal emitted at a specific transmission power may vary depending on the location of the target tag. Hence, the target tag may especially determine the transmission power based on (local) measurements, and use this transmission power as the target tag moves (through the space). For example, the target tag may select a tag transmission power with which, according to its measurements in its present location, it would reach four listener nodes. However, as the target tag moves through the space, the tag beacon signal may depending on its location also reach fewer or more listener nodes, which may, among others, depend on the whether the listener nodes are arranged in a regular or irregular pattern. In embodiments (also see below) the target tag may be configured to (re-)execute the tag operational mode after moving further than a movement threshold, or a control system (of an asset-tracking system) may instruct the target tag to (re-) execute the tag operational mode. Further, the invention may be particularly beneficial in embodiments wherein a large proportion of the listener nodes are arranged in a regular grid such that the (re-)execution of the tag operational mode may be limited, such as embodiments wherein the listener nodes are incorporated into a lighting system.

In the execution stage, the target tag may emit the target beacon signal at the tag transmission power. Hence, the execution stage may comprise emitting the target beacon signal at the tag transmission power determined in the signal processing stage.

In particular, the target tag may (be configured to) remain in the execution stage until restarting the operational mode (see below).

In further embodiments, in the execution stage, the target tag may (be configured to) periodically emit a target beacon signal (in the execution stage). In further embodiments, in the execution stage, the target tag may (be configured to) emit a target beacon signal according to a regular period, such as every 15 minutes. However, in further embodiments, the target tag may emit the target beacon signal according to an irregular period, such as a period varying over the time of day, or whenever an external signal is received, or whenever the target tag is moved. For example, the target tag may comprise a (passive) RFID tag and may emit the target beacon signal upon receiving a (suitable) radio wave.

In further embodiments, the target tag may (be configured to) (essentially) continuously emit a target beacon signal.

The target beacon signal may comprise any type of signal that may be detectable by the plurality of listener nodes. In embodiments, the beacon signal may, for example, comprise a wireless communication signal, such as a wireless communication signal selected from the group comprising Bluetooth signals, ZigBee (beacon packet) signals, Wi-Fi (beacon packet) signals, Li-Fi (beacon packet) signals, ultra-wideband packet signals, and thread signals. In embodiments, the target beacon signal may comprise one or more carrier frequencies, especially a plurality of carrier frequencies.

The target beacon signal may especially comprise a target tag identification code. The target tag identification code may be specific for the target tag, and may especially be suitable to uniquely identify the target tag. Thereby, different target tags may be distinguished, and different (tagged) items may be (independently) tracked.

The target beacon signal may also comprise a target beacon signal sequence number. The target beacon signal sequence number may be specific for the target tag in a given time, and may be increased sequentially until it reaches the maximum number allowed before it wraps back to the minimum number allowed. Thereby, different target beacon signals may be distinguished, and different target beacon signals from the target tag may be uniquely identified, by e.g. the listener nodes, within a short period of time, within which it is known to be impossible to have more than one target beacon signal from the target tag with identical sequence numbers.

In embodiments, the target tag may be configured to, especially in the signal processing stage, determine for each listener node of the plurality of listener nodes one or more of (i) a (respective) receiver sensitivity $R_i$ based on the receiver sensitivity-related data, (ii) a (respective) listener transmission power $L_i$ based on the transmission power-related data, and (iii) a (respective) signal strength $S_i$ based on the related listener beacon signal strengths.

In further embodiments, the predetermined goal number of reached listener nodes may comprise an upper goal number, especially wherein the target tag may be configured to determine the tag transmission power $T_t$, such that for less than or equal to the upper goal number of the plurality of listener nodes applies that $T_t \geq R_i + L_i - S_i$. Especially, the term "$L_i - S_i$" may be indicative of the expected signal strength loss that may occur as the target beacon signal travels from the target tag to the ($i_{th}$) listener node. Hence, in order for the target beacon signal to be detected (and/or processed) by the ($i_{th}$) listener node, the tag transmission power $T_t$ may need to be at least the receiver sensitivity $R_i$+the expected signal strength loss $L_i - S_i$. As the predetermined goal number comprises an upper goal number, the formula $T_t \geq R_i + L_i - S_i$ should thus apply for less than or equal to the upper goal number of the plurality of listener nodes.

Similarly, in further embodiments, the predetermined goal number of reached listener nodes may comprise a lower goal number, wherein the target tag may be configured to determine the transmission power $T_t$, such that for more than or equal to the lower goal number of listener nodes of the plurality of listener nodes applies that $T_t \geq R_i + L_i - S_i$.

In further embodiments, the target tag may be configured to minimize the transmission power $T_t$. Hence, the target tag may be configured to minimize the transmission power in view of the predetermine goal number of listener nodes, especially in view of the lower goal number of listener nodes.

The transmission power $T_t$ may be selected to account for some variation in, for example, signal loss. Hence, it may be desirable to select a value for $T_t$ that is slightly larger than the minimal value determined to reach the predetermined (lower) goal number. For example, the tag transmission power $T_t$ may be selected such that the tag transmission power $T_t$ has an added strength $T_a$ relative to the tag transmission power minimally needed in view of the predetermined goal number of reached listener nodes. Hence, $T_t$ may be selected such that for more than or equal to the lower goal number of listener nodes of the plurality of listener nodes applies that $T_t \geq R_i + L_i - S_i + T_a$, wherein the added strength $T_a$ is at least 0.1 dBm, such as at least 0.2 dBm, especially at least 0.5 dBm, such as at least 1 dBm, such as at least 2 dBm. In further embodiments, the added strength $T_a$ may be at most 3 dBm, such as at most 2 dBm, especially at most 1 dBm.

Upon detecting the listener beacon signals, the target tag may further (be configured to) determine a related listener beacon signal quality. The term "signal quality" may herein especially refer to the quality of a detected signal. In particular, the quality may, for example, be determined by comparing the detected signal to a (perfect) sigmoidal signal. The signal quality may be indicative of the how informative/trustworthy the signal is. The target tag may (be configured to) determine (or adjust) the predetermined goal number of reached listener nodes based on the related listener beacon signal qualities. For example, the target tag may detect beacon signals of six listener nodes, wherein two of the strongest signals have a poor signal quality. Hence, the target tag may, for example, set the predetermined goal number at 5, such that three listener nodes of which the listener beacon signal had a sufficient signal quality would detect the target beacon signal. Hence, in embodiments, in the tag operational mode the target tag may (be configured to) determine the predetermined goal number of reached listener nodes based on a predetermined signal quality requirement.

In further embodiments, the predetermined signal quality requirement may be changed by, for example, a functionally coupled control system, such as a control system of an asset-tracking system. In particular, the asset-tracking system may inform the listener node that—for example in view of localization difficulties and/or importance of tracking the associated object—the predetermined signal quality is to be adjusted to a different value.

The term "signal quality" may herein especially refer to the quality of the detected tag beacon signal. In particular, the quality may, for example, be determined by comparing the detected target beacon signal to a (perfect) sigmoidal signal. The signal quality may be indicative of the how informative/trustworthy the signal is.

In embodiments, the lower goal number may be at least 3, such as at least 4, especially at least 5, such as at least 7. In general, detection by three listener nodes may enable a decent target tag localization. In further embodiments, the upper goal number may be at most 20, such as most 15, especially at most 10, such as at most 8, especially at most 5.

In embodiments, the target tag may be configured to (re-)execute the tag operational mode according to a scanning frequency, such as at least every day or at least every few hours, at least every few minutes, such as at least every 5 minutes, or at least every 2 minutes, or at least every few seconds, such as at least every 10 seconds, or at least every two seconds, such at least as every second. In further embodiments, the scanning frequency may be based on one or more of movement (of the target tag), battery life (of the target tag), and a predefined period. In particular, the target tag may have a predefined period for the scanning frequency, such as about every 5 minutes, but may further be configured to adjust the scanning frequency based on one or more movement and battery life. In particular, the target tag may be configured to reduce the time till the next scan due to movement, i.e., the target tag may (be configured to) (at least temporarily) reduce the scanning frequency when the target tag moves, especially when the target tag moves more than a predetermined movement threshold. Similarly, the target tag my be configured to increase the time till the next scan based on battery life, i.e., the target tag may (be configured to) (at least temporarily) increase the scanning frequency when the battery depletes, especially when the battery life falls below a predefined battery threshold, such as below 15% of full battery life, especially below 5% of full battery life.

In further embodiments, the target tag may be configured to (re-)execute the tag operational mode upon receiving an (external) tag calibration signal. For example, an asset-tracking system may be configured to send out a tag calibration signal (for the target tag) when localization of the target tag is considered in need of improvement. For example, due to circumstances, the target tag localization may have become more important (the target may be associated to a specialist who may soon be needed), the signal quality of the target beacon signal as detected by the listener nodes may be below a quality standard, or the target beacon signal may no longer be sufficiently detected for localization (the target tag may have moved to a part of the space with a reduced density of listener nodes). As will be clear to the person skilled in the art, further variations on this theme are possible.

As indicated above, listener nodes may generally periodically emit listener beacon signals, especially according to a reporting frequency. However, there may be asset-tracking system wherein the listener nodes do not periodically emit listener beacon signals, or wherein the time between listener beacon signals is relatively long. With regards to the latter case, as it may be relatively energy-consuming for the target tag to operate in the detection stage, staying in the detection stage for a time period wherein each listener node should have emitted a listener beacon signal (according to their reporting frequency) may be undesirable.

Hence, in embodiments, the target tag may, in the tag operational mode, especially in an initiation stage, (be configured to) emit a listener beacon signal request signal. Hence, the tag operational mode may further comprise an initiation stage. In the initiation stage the target tag may (be configured to) emit the listener beacon signal request signal, i.e., the initiation stage may comprise the target tag emitting the listener beacon signal request signal. The plurality of listener nodes may be configured to emit the listener beacon signals upon receiving the listener beacon signal request signal. Hence, thereby each listener node may emit a (respective) listener beacon signal in a short time window, implying that the target tag may limit the length of the detection stage, which may be beneficial for battery life. Especially, the listener beacon signal request signal is a request signal from the target tag to the listener nodes to provide a listener beacon signal. Hence, the listener beacon signal request signal is configured to control the plurality of listener nodes to emit the listener beacon signals upon receiving the listener beacon signal request signal.

In further embodiments, the target tag may have access to the reporting frequency (of the plurality of listener nodes). The reporting frequency may especially comprise a default reporting frequency and/or especially a specific reporting frequency, especially a default reporting frequency, or especially a specific reporting frequency.

In a further aspect, the invention may provide an asset-tracking system functionally couplable with or comprising the target tag according to the invention, especially comprising the target tag. The asset-tracking system may be (configured for) tracking the target tag in a space. The asset-tracking system may further comprise a plurality of listener nodes and a control system. The plurality of listener nodes may especially be arranged in the space, and the plurality of listener nodes may especially be configured to (periodically) emit listener beacon signals. The control system may have access to listener location data and/or map data. The asset-tracking system may be operated in a system operational mode. In the system operational mode: each of the plurality of listener nodes may (be configured to) detect the target beacon signal and to provide a related target signal to the control system; and the control system may be (configured to) determine a target tag location of the target tag based on the related target signals, and especially also based on the listener location data and/or the map data.

In specific embodiments, the invention may provide an asset-tracking system comprising a target tag, wherein the asset-tracking system comprises a plurality of listener nodes and a control system, wherein the plurality of listener nodes are configured to emit listener beacon signals, and wherein in a system operational mode: (i) each of the plurality of listener nodes is configured to detect the target beacon signal and to provide a related target signal to the control system; and (ii) the control system is configured to determine a target tag location of the target tag based on the related target signals.

Hence, the invention may provide an asset-tracking system for tracking a target tag in a space. The term "asset-tracking system" may refer to any system configured to track the location and/or movement of one or more objects, especially target tags, within a space, especially within a (defined) space (see above).

The asset-tracking system may comprise a plurality of listener nodes. Listener nodes may in the art generally also be referred to as "tag listener", "tag locator", "anchor node", "tag scanner", "reference node", and "sniffer". In embodiments, the listener nodes may be configured to detect (or: "receive") the target beacon signal, i.e., the listener nodes may be capable of detecting the target beacon signal. The listener nodes may especially be passively detecting the target beacon signal. In further embodiments, the listener nodes may comprise antenna configured for detecting (or: "receiving") the target beacon signal.

The listener nodes may especially be arranged in the space, i.e., in the space in which a target tag is to be tracked. It will be clear to the person skilled in the art that the listener nodes may be arranged in locations the target tag generally does not reach, e.g., the target tag may be used to track a person in an office building, and the listener nodes may be arranged in the lighting system of the office building.

In embodiments, at least part of the listener nodes of the plurality of listener nodes, especially each listener node of the plurality of listener nodes, may be configured to adjust the detection threshold to the detection threshold value (for the target tag) when the target tag informs the listener node(s) to set the detection threshold (for the target beacon signal) at the detection threshold value.

In embodiments, the asset-tracking system may further comprise a control system. The control system may especially be configured to control the asset-tracking system, especially the plurality of listener nodes. The control system may especially be configured to (have to asset-tracking system) execute the system operational mode.

In embodiments, the control system may have access to location data of the plurality of listener nodes. The location data may especially comprise data on the locations of (each of) the plurality of listener nodes in the space, such as data regarding the rooms of (each of) the listener nodes, or such as coordinates of (each of) the listener nodes.

Phrases like "in the operational mode, the control system may determine a target tag location", or "in the operational mode, the control system executes a (step of a) method", or "in the operational mode, the control system may execute a method", and similar phrases, may also in embodiments be read that the control system is configured to perform the indicated action (in an operational mode), such as configured to determine a target tag location in an operational mode, or configured to execute a (step of a) method in an operational mode.

In embodiments, the listener beacon signals may comprise one or more of transmission power-related data and receiver sensitivity-related data of the plurality of listener nodes, especially one or more of specific transmission power-related data and specific receiver sensitivity-related data, especially specific transmission power-related, or especially specific receiver sensitivity-related data. In particular, each listener node may be configured to emit a listener beacon signal comprising one or more of (respective) specific transmission power-related data and (respective) specific receiver sensitivity-related data, especially (respective) specific transmission power-related data, or especially (respective) specific receiver sensitivity-related data. Thereby, the target tag may access the (specific) transmission power-related data and/or receiver sensitivity-related data of the plurality of listener nodes, which may facilitate and/or improve the tag operational mode, with all associated benefits.

In embodiments, the control system may be configured to send a tag calibration (request) signal. As also indicated above, in embodiments, the target tag may be configured to execute the tag operational mode upon receiving the tag calibration (request) signal. The control system may especially be configured to send the tag calibration signal when one or more applies of: the accuracy of target tag localization is below a (predefined) accuracy threshold, and the signal quality of the (detected) target beacon signal is below a (predefined) signal quality threshold. In further embodiments, the control system may adjust the accuracy threshold and the signal quality threshold on the basis of input data, such as input data related to the (temporary) importance of a target tag, or such as input data from a user interface.

In embodiments, the control system may be configured to determine a (suitable) calibration site for the target tag, especially wherein the control system informs the target tag of the calibration site. For example, in embodiments, the control system may (be configured to) determine a calibration site that is representative of an average area, especially with regards to listener node density, in the space, such as especially representative of an average area in the part of the space the target tag historically moved through. Hence, the control system may have access to one or more of listener location data, map data, and historic data. In further embodiments, the control system may be configured to determine a (suitable) calibration site for the target tag based on one or more of the listener location data, the map data, and the historic data. The historic data may especially comprise data regarding previous tag locations.

The asset-tracking system may especially be (at least partially) integrated into other (pre-existing) infrastructure. In particular, in embodiments, (at least part of a total number of) the plurality of listener nodes may be integrated in lighting devices, such as at least 50% of a total number of the plurality of listener nodes may be integrated in lighting devices. Lighting devices may be equipped with low-bandwidth wireless communication devices for controlling the lighting devices. For example, a light generating device may comprise or be functionally coupled to a wireless communication device such that the light generating device can be controlled remotely. Hence, in embodiments, the wireless communication device may comprise a listener node.

The term "lighting device" may herein, for example, refer to one or more of a light generating device, a light control element, such as a light switch, and sensor, such as an occupancy sensor or a proximity sensor.

In further embodiments, the asset-tracking system may comprise a plurality of lighting devices, wherein (at least part of) the plurality of listener nodes are integrated in the lighting devices.

In embodiments, at least 30% of a total number of the plurality of listener nodes may be arranged in a regular grid, such as in a regular grid of lighting devices. In further embodiments, at least 50% of a total number of the plurality of listener nodes may be arranged in a regular grid, such as at least 60%, especially at least 70%, such as at least 80%, especially at least 90%, including 100%. The term "regular grid" may herein especially refer to a pattern formed by intersections of two or more sets of regularly spaced parallel lines, especially wherein listener nodes are arranged at the intersections. In further embodiments, the listener nodes comprised by the regular grid may be arranged at (essentially) the same height, such as on the ceiling. In further embodiments, the plurality of listener nodes, may further comprise one or more listener nodes which are not comprised by the regular grid and which are configured at a different height than the listener nodes configured in the regular grid.

The term "target tag" may herein also refer to a plurality of target tags. In particular, in embodiments, the asset-tracking system may be configured to simultaneously track a plurality of target tags. In further embodiments, (at least) two target tags of a plurality of target tags may have a different predetermined goal number of reached listener nodes.

In a further aspect, the invention may provide a method for calibrating a target tag, especially wherein the target tag is configured to detect listener beacon signals emitted by a plurality of listener nodes. The method may comprise one or more of a detection stage, a signal processing stage and an execution stage. The detection stage may comprise detecting the listener beacon signals with the target tag and determining related listener beacon signal strengths. The signal processing stage may comprise determining a tag transmission power based on the related listener beacon signal strengths, the transmission power-related data, the receiver sensitivity-related data, and a predetermined goal number of reached listener nodes. The execution stage may comprise emitting a target beacon signal with the target tag at the tag transmission power.

In embodiments, the method may comprise determining a target beacon signal strength offset based on a predetermined goal number of reached listener nodes, the related listener beacon signal strengths, the transmission power-related data and the receiver sensitivity-related data; determining on the basis of the target beacon signal strength offset one or more of (a) a (first) transmission power of the target beacon signal and (b) a detection threshold value; executing one or more of (a) emitting the target beacon signal at the (first) transmission power, and (b) informing at least part of the plurality of listener nodes to set the detection threshold (for the target tag) at the detection threshold value.

In embodiments, the method may comprise: detecting the listener beacon signals with the target tag and determining related listener beacon signal strengths; determining a tag transmission power and/or a receiving signal strength threshold based on the related listener beacon signal strengths, the transmission power-related data, the receiver sensitivity-related data, and a predetermined goal number of reached listener nodes; and emitting a target beacon signal with the target tag at the tag transmission power and/or indicating the receiving signal strength threshold in the target beacon signal that is to be applied by the listeners when receiving (the target beacon signal). In particular, the method may comprise determining a receiving signal strength threshold based on the related listener beacon signal strengths, the transmission power-related data, the receiver sensitivity-related data, and a predetermined goal number of reached listener nodes; and indicating the receiving signal strength threshold in the target beacon signal that is to be applied by the listeners when receiving (the target beacon signal).

In a further aspect, the invention may provide a computer program product comprising instructions for execution on a computer functionally coupled to a target tag, wherein the instructions, when executed by the computer, cause the target tag to carry out the method of the invention or the tag operational mode, especially the method of the invention, or especially the tag operational mode.

In embodiments, the computer program product may be executable by a computer functionally coupled to the target tag to have the target tag carry out the method of the invention. In a further aspect, the invention may provide a data carrier, carrying thereupon program instructions which, when executed by a computer functionally coupled to the target tag, cause the target tag to carry out the method of the invention or the tag operational mode, especially the method of the invention, or especially the tag operational mode.

The term "stage" and similar terms used herein may refer to a (time) period (also "phase") of a method and/or an operational mode. The different stages may (partially) overlap (in time). For example, the detection stage may, in general, be initiated prior to the signal processing stage, but may partially overlap in time therewith. However, for example, the signal processing stage may typically be completed prior to the execution stage. It will be clear to the person skilled in the art how the stages may be beneficially arranged in time.

In further aspects, the invention may provide: a target tag for object tracking, wherein the target tag is configured to detect listener beacon signals emitted by a plurality of listener nodes, wherein the target tag has access to transmission power-related data and receiver sensitivity-related data of the plurality of listener nodes, and wherein in a tag operational mode the target tag is configured to: detect the listener beacon signals and to determine related listener beacon signal strengths; determine a tag transmission power based on at least one of: the related listener beacon signal strengths, the transmission power-related data, the receiver sensitivity-related data, and a predetermined goal number of reached listener nodes; and emit the target beacon signal at the tag transmission power.

In further aspects, the invention may provide: a target tag for object tracking, wherein the target tag is configured to detect listener beacon signals emitted by a plurality of listener nodes, wherein the target tag has access to transmission power-related data and receiver sensitivity-related data of the plurality of listener nodes, and wherein in a tag operational mode the target tag is configured to: detect the listener beacon signals and to determine related listener beacon signal strengths; determine a detection threshold range based on at least one of: the related listener beacon signal strengths, the transmission power-related data, the receiver sensitivity-related data, and a predetermined goal number of reached listener nodes; and emit the target beacon signal comprising the detection threshold range to each listener node of the plurality of listener nodes; wherein said target beacon signal is arranged for enabling each listener node to set a receiver detection sensitivity to the detection threshold range.

The advantages and/or embodiments of the first object of the invention may mutatis mutandis apply to said further aspects of the invention.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1:
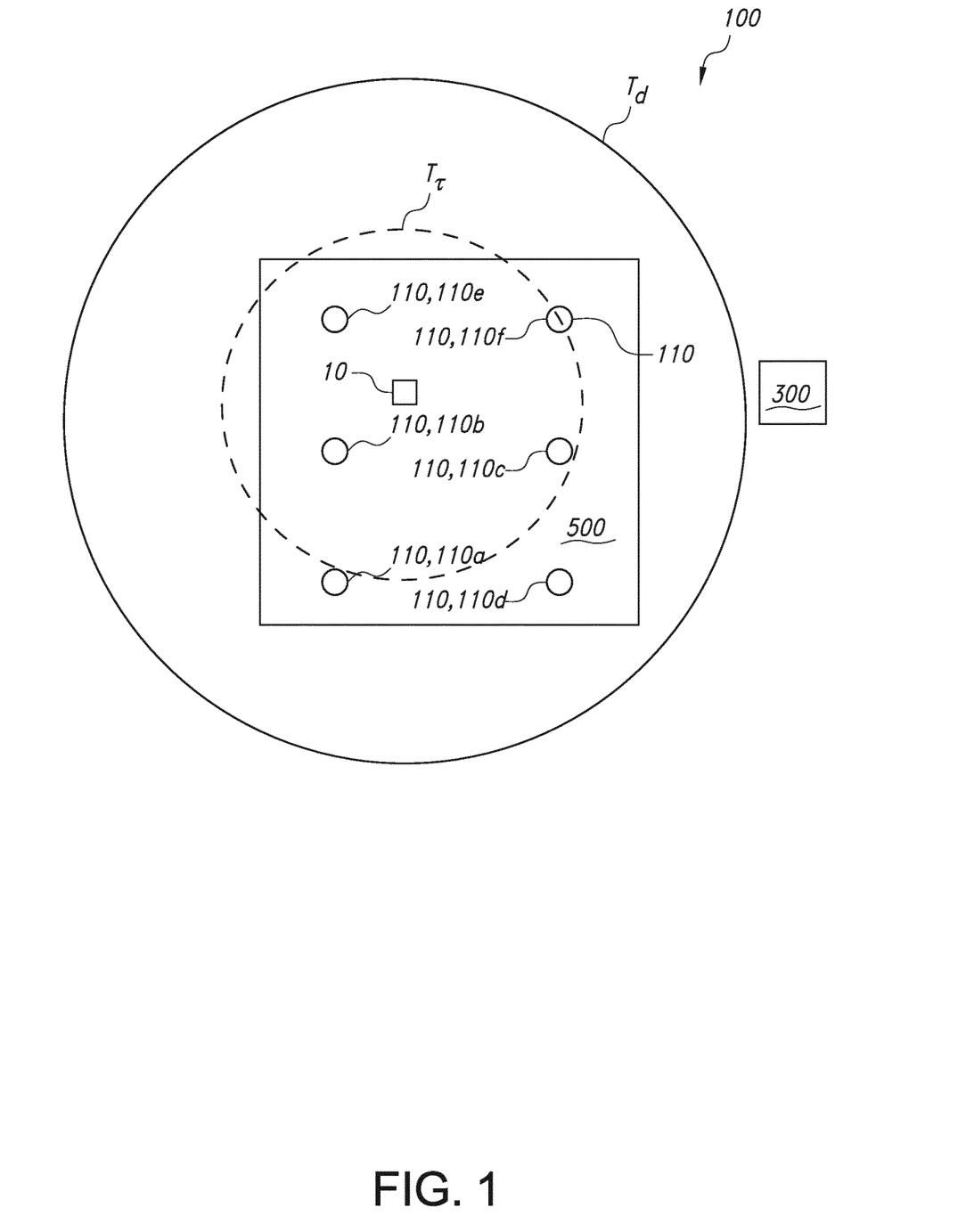
FIG. 1 schematically depicts embodiments of the target tag and the asset-tracking system.

FIG. 1 schematically depicts an embodiment of the target tag 10 for object tracking. In the depicted embodiment, the target tag 10 is configured to detect listener beacon signals emitted by a plurality of listener nodes 110 (of an asset-tracking system 100), especially wherein the target tag 10 has access to transmission power-related data and receiver sensitivity-related data of the plurality of listener nodes 110. In a tag operational mode, the target tag may be configured to: (i) detect (in a detection stage) the listener beacon signals and determine related listener beacon signal strengths; (ii) determine (in a signal processing stage) a tag transmission power $T_t$ based on the related listener beacon signal strengths, the transmission power-related data, the receiver sensitivity-related data, and a predetermined goal number of reached listener nodes; and emit (in an execution stage) the target beacon signal at the tag transmission power Tt.

For visualizational purposes, the tag transmission power $T_t$ is depicted as a circle around the target tag 10, indicative of the area in which a listener node 110 would need to be present to detect (and/or process) the target beacon signal. It will be clear to the person skilled in the art that this is a simplified representation and may not account for, for example, different receiver sensitivities of different listener nodes 110.

In the depicted embodiment, the target tag 10 may have default settings to emit the target beacon signal at a default transmission power $T_d$, with which six different listener nodes 110, 110a, 110b, 110c, 110d, 110e, 110f may be reached. However, three listener nodes may be sufficient for accurate localization. Hence, the default transmission may be excessive for the space 500 the target tag 10 is currently in.

The target tag 10 may have access to transmission power-related data and receiver sensitivity-related data of the plurality of listener nodes 110. In the depicted embodiment, the target tag may especially have access to transmission power-related data and receiver sensitivity-related data of each of the listener nodes 110a, 110b, 110c, 110d, 110e, and 110f. Further, in the detection stage, the target tag may acquire listener beacon signal strengths related to the listener beacon signals of the plurality of listener nodes 110, especially each listener node 110 of the plurality of listener nodes 110a, 110b, 110c, 110d, 110e, and 110f.

In particular, for each listener node 110 of the plurality of listener nodes 110, the target tag 10 may determine a (respective) receiver sensitivity $R_i$ based on the receiver sensitivity-related data, a (respective) listener transmission power $L_i$ based on the transmission power-related data, and a (respective) signal strength $S_i$ based on the related listener beacon signal strengths. Based on this information, the target tag 10 can for each listener node 110 determine the (respective) transmission power $T_i$ that would be needed for the listener node 110 to detect the target beacon signal. Specifically, in embodiments, $T_i$ may be determined according to: $T_i = R_i + L_i - S_i$. Hence, with regards to the embodiment of FIG. 1A, the target tag 10 may have access to the information summarized in Table 1:

| Listener node | $R_i$ [dBm] | $L_i$ [dBm] | $S_i$ [dBm] | $T_i$ [dBm] |
|---|---|---|---|---|
| 110a | −96 | 0 | −90 | −6 |
| 110b | −96 | 0 | −66 | −30 |
| 110c | −96 | 0 | −82 | −14 |
| 110d | −96 | 0 | −93 | −3 |
| 110e | −96 | 0 | −75 | −21 |
| 110f | −96 | 0 | −88 | −8 |

Hence, a target beacon signal emitted from the target 10 at a transmission power of −15 dBm would, according to the data available to the tag, be sufficient for detection by listener nodes 110b and 110e, whereas a target beacon signal emitted from the target 10 at a transmission power of −10 dBm would also be sufficient for detection by listener node 110c.

In further embodiments, the predetermined goal number of reached listener nodes 110 may comprise an upper goal number $n_U$, wherein the target tag 10 is configured to determine the tag transmission power $T_t$ such that for less than or equal to the upper goal number $n_U$ of the plurality of listener nodes 110 applies that $T_t \geq T_i$, i.e., that for less than or equal to the upper goal number $n_u$ of the plurality of listener nodes 110 applies that $T_t \geq R_i + L_i - S_i$. In embodiments, the upper goal number $n_U$ may be at most 20, such as most 15, especially at most 10, such as at most 8, especially at most 5. For example, with regards to the information in table 1, if $n_U$ is 5, then $T_t$ has to be smaller than the largest $T_i$ (as there are six listener nodes), which is −3 dBm, hence, with regards to above example, for $n_U$=5, $T_t$<−3 dBm.

Hence, in embodiments, the target tag may be configured to determine the tag transmission power $T_t$ according to a (pseudo-)optimization problem comprising:

$$\text{Select } T_t$$
$$\text{Subject to } \sum (T_t \geq R_i + L_i - S_i) \leq n_U \text{ for } i = 1, \ldots, m$$
$$T_{min} \leq T_t \leq T_{max}$$

wherein m is the total number of (relevant) listener nodes, wherein $T_{min}$ is the minimum transmission power the target tag can emit at (which may be hardware-determined or software-determined), and wherein $T_{max}$ is the maximum transmission power the target tag 10 can emit at.

In further embodiments, the predetermined goal number of reached listener nodes 110 may comprise a lower goal number $n_L$, wherein the target tag 10 is configured to determine the transmission power $T_t$ such that for more than or equal to the lower goal number $n_L$ of listener nodes 110 of the plurality of listener nodes 110 applies that $T_t \geq T_i$, i.e., such that for more than or equal to the lower goal number $n_L$ of listener nodes 110 of the plurality of listener nodes 110 applies that $T_t \geq R_i + L_i - S_i$. In embodiments, the lower goal number $n_L$ may be at least 3, such as at least 4, especially at least 5, such as at least 7. For example, with regards to the information in table 1, if $n_L$ is 3, then $T_t$ has to be larger than the third smallest $T_i$, which is −14 dBm, hence, with regards to above example, for $n_U$=5, $T_t \geq$−14 dBm.

Hence, in further embodiments, the target tag may be configured to determine the tag transmission power $T_t$ according to a (pseudo-)optimization problem comprising:

$$\text{Select } T_t$$
$$\text{Subject to } \sum (T_t \geq R_i + L_i + S_i) \leq n_L \text{ for } i = 1, \ldots, m$$
$$T_{min} \leq T_t \leq T_{max}$$

In further embodiments, the predetermined goal number may comprise both a lower goal number $n_L$ and an upper goal number $n_U$, especially wherein $n_U \geq n_L$. For example, with regards to the information in table 1, if $n_L$=3 and $n_U$=5, then $T_t$ has to be larger than the third smallest $T_i$, which is −14 dBm, and smaller than the largest $T_i$, which is −3 dBm, hence, with regards to above example, −14 dBm$\leq T_t$<−3 dBm.

Hence, in further embodiments, the target tag may be configured to determine the tag transmission power $T_t$ according to a (pseudo-)optimization problem comprising:

$$\text{Select } T_t$$
$$\text{Subject to } \sum (T_t \geq R_i + L_i + S_i) \leq n_U \text{ for } i = 1, \ldots, m$$
$$\sum (T_t \geq R_i + L_i + S_i) \geq n_L \text{ for } i = 1, \ldots, m$$
$$T_{min} \leq T_t \leq T_{max}$$

In embodiments, the target tag 10 may be configured to minimize the transmission power $T_t$. Hence, in embodiments, the (pseudo-)optimization problem may contain a minimization criterion. For example, with regards to the example of Table 1, and wherein if $n_L$ is 3 and $n_U$ is 5, $T_t$ may be selected to be −14 dBm in view of the minimization criterion.

Hence, in embodiments, the (pseudo-)optimization problem may, for example, comprise:

$$\text{Minimize } T_t$$
$$\text{Subject to } \sum (T_t \geq R_i + L_i + S_i) \geq n_L \text{ for } i = 1, \ldots, m$$
$$T_{min} \leq T_t \leq T_{max}$$

Similarly, the target tag 10 may be configured to maximize the transmission power $T_t$. Hence, in embodiments, the (pseudo)-optimization problem may comprise:

$$\text{Maximize } T_t$$
$$\text{Subject to } \sum (T_t \geq R_i + L_i - S_i) \leq n_U \text{ for } i = 1, \ldots, m$$
$$T_{min} \leq T_t \leq T_{max}$$

In practice, it may be desirable to select a value for $T_t$ that is slightly larger than the minimal value determined to reach the predetermined (lower) goal number. For example, the tag transmission power $T_t$ may be selected such that the tag transmission power $T_t$ has an added strength $T_a$ relative to the tag transmission power minimally needed in view of the predetermined goal number of reached listener nodes 110, wherein the added strength $T_a$ is at least 0.1 dBm, such as at least 0.2 dBm, especially at least 0.5 dBm, such as at least 1 dBm, such as at least 2 dBm. In further embodiments, the added strength $T_a$ may be at most 3 dBm, such as at most 2 dBm, especially at most 1 dBm.

As indicated above, as an alternative to adjusting the tag transmission power, the target tag may also inform the plurality of listener nodes to adjust their desired threshold value for receiving and processing the target beacon signal. In the example above, the target tag 10 may inform the listener nodes 110 to set the detection threshold value in the range of −82 dBm and −88 dBm. In this way, listener nodes 110b, 110c and 110e will be able to report the target beacon signal because their received signal strengths would lie above the detection threshold level, while the other listener nodes 110 will not.

In particular, with respect to the formulae above, the target tag may adjust $S_i$ of (at least part of) the plurality of listener nodes. Hence, the pseudo-optimization problem may comprise:

$$\text{Select } S_i$$
$$\text{Subject to } \sum (T_t \geq R_i + L_i - S_i) \leq n_U \text{ for } i = 1, \ldots, m$$
$$S_{min} < S_i \leq S_{max}$$
$$T_{min} \leq T_t \leq T_{max}$$

It will be clear for the person skilled in the art that the pseudo-optimization problems may also be combined. For example, in further embodiments, the pseudo-optimization problem may comprise:

$$\text{Select } T_t, S_i$$
$$\text{Subject to } \sum (T_t \geq R_i + L_i - S_i) \leq n_U \text{ for } i = 1, \ldots, m$$
$$S_{min} < S_i \leq S_{max}$$
$$T_{min} \leq T_t \leq T_{max}$$

Hence, in embodiments, the target tag 10 is configured to emit a target beacon signal, and wherein the target tag 10 is configured to detect listener beacon signals emitted by a plurality of listener nodes 110, and wherein each of the plurality of listener nodes 110 is configured to detect the target beacon signal and to report a related target signal if a target signal strength of the target beacon signal exceeds a detection threshold, and wherein the target tag 10 has access to transmission power-related data and receiver sensitivity-related data of the plurality of listener nodes 110, and wherein in an operational mode the target tag 10 is configured to: detect the listener beacon signals and to determine related listener beacon signal strengths; determine a target beacon signal strength offset based on a predetermined goal number of reached listener nodes 110, the related listener beacon signal strengths, the transmission power-related data and the receiver sensitivity-related data; determine on the basis of the target beacon signal strength offset one or more of (a) a transmission power of the target beacon signal and (b) a detection threshold value and execute one or more of (a) emitting the target beacon signal at the transmission power, and (b) informing at least part of the plurality of listener nodes 110 to set the detection threshold at the detection threshold value.

In further embodiments, the target beacon signal may comprise instructions for the (at least part of the) plurality of listener nodes 110 to adjust the detection threshold value.

In embodiments, the target tag 10 may be configured to detect listener beacon signals emitted by a plurality of listener nodes, wherein the target tag 10 has access to transmission power-related data and receiver sensitivity-related data of the plurality of listener nodes 110, and wherein in a tag operational mode the target tag 10 is configured to: detect the listener beacon signals and to determine related listener beacon signal strengths; determine a (receiver) detection threshold range (for each listener node 110 of the plurality of listener nodes 110) based on the related listener beacon signal strengths, the transmission power-related data, the receiver sensitivity-related data, and a predetermined goal number of reached listener nodes 110; and emit the target beacon signal comprising the detection threshold range, especially to at least part of the listener nodes 110 of the plurality of listener nodes 110, more especially to each listener node 110 of the plurality of listener nodes 110. In further embodiments, the target beacon signal, especially comprising the detection threshold range, may be arranged for enabling (each of) the listener nodes 110 (of the plurality of listener nodes 110) to set a (respective) receiver sensitivity to the detection threshold range.

In further embodiments, the predetermined goal number may comprise a desired goal number, and the target tag may be configured to minimize the deviation of the desired goal number of reached nodes and actual number of reached nodes.

FIG. 1 further schematically depicts an embodiment of the asset-tracking system 100 comprising a target tag 10. In the depicted embodiment, the asset-tracking system is configured for tracking the target tag 10 in a space 500. The asset-tracking system 100 comprises a plurality of listener nodes 110 and a control system 300, wherein the plurality of listener nodes 110 are arranged in the space 500, and wherein the plurality of listener nodes 110 are configured to emit listener beacon signals. The system 100 may have a system operational mode, wherein in the system operational mode: (i) each of the plurality of listener nodes 110 is configured to detect the target beacon signal (of the target tag) and to provide a related target signal to the control system 300; and (ii) the control system 300 is configured to determine a target tag location of the target tag 10 based on the related target signals.

Figure 2:
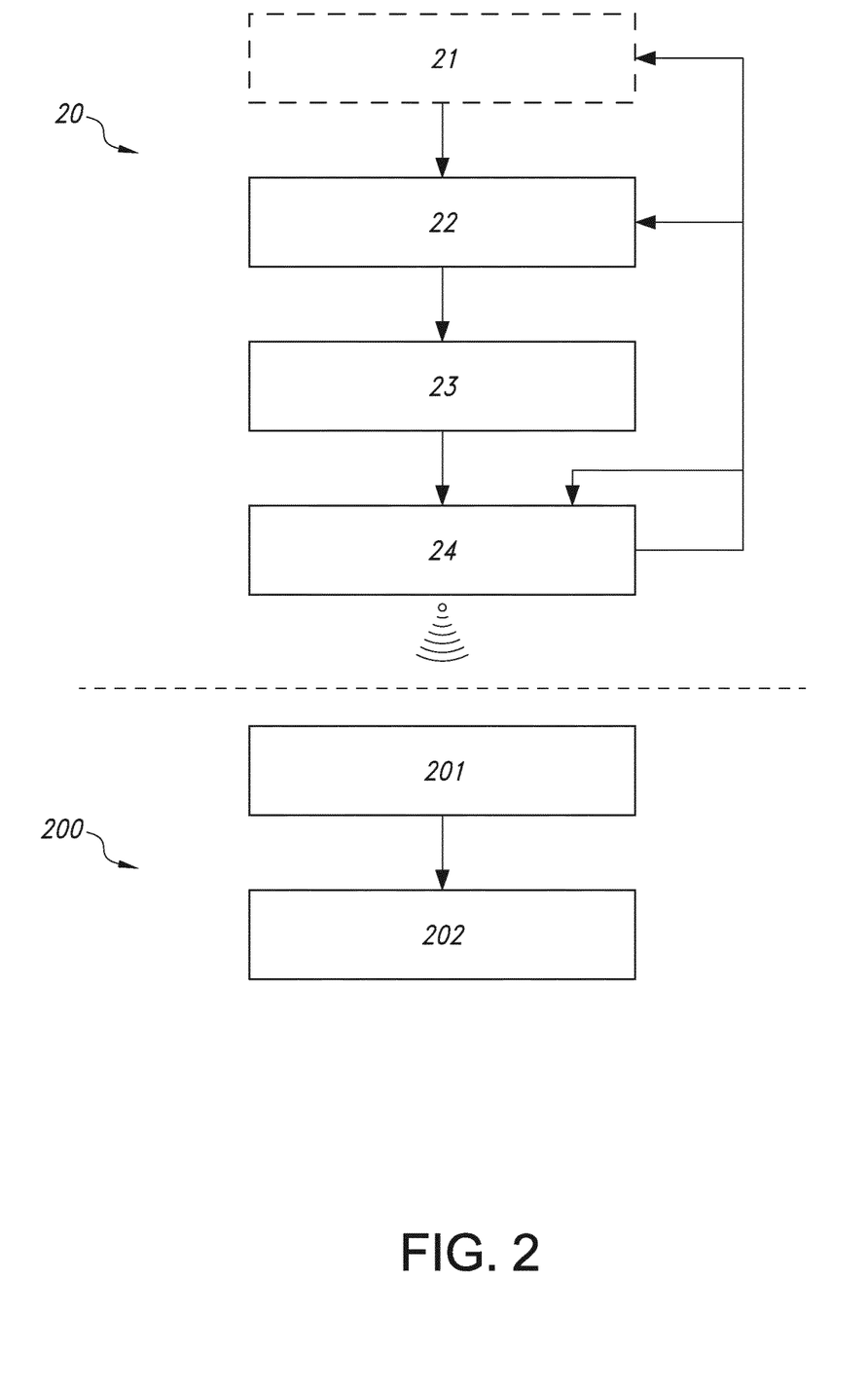
FIG. 2 schematically depicts embodiments of the tag operational mode and the system operational mode.

FIG. 2 schematically depicts the tag operational mode 20 and the system operational mode 200.

The tag operational mode 20 may comprise a detection stage 22, a signal processing stage 23, and an execution stage 24. In the detection stage 22 the target tag 10 may (be configured to) detect listener beacon signals and determine related listener beacon signal strengths. In the signal processing stage 23 the target tag 10 may (be configured to) determine a tag transmission power $T_t$ based on the related listener beacon signal strengths, transmission power-related data, receiver sensitivity-related data, and a predetermined goal number of reached listener nodes. In the execution stage 24 the target tag 10 may (be configured to) emit the target beacon signal at the tag transmission power $T_t$. In further embodiments, the target beacon signal may comprise instructions for the plurality of listener nodes 110 to adjust the detection threshold value.

In particular, as depicted in FIG. 2, the execution stage 24 may be repeated multiple times. The execution stage 24 may be repeated until the tag operational mode 20 is (re-)executed and, for example, restarts in the detection stage.

In embodiments, the target tag 10 may be configured to (re-)execute the tag operational mode according to a scanning frequency, especially wherein the scanning frequency is based on one or more of movement, battery life, and a predefined period. In further embodiments, the target tag 10 may be configured to (re-)execute the tag operational mode upon receiving an (external) tag calibration signal.

In embodiments, the target tag 10 may be configured to remain in the execution stage even if the target tag 10, is switched off and on again, i.e., the target tag may be configured only to execute the tag operational mode according to one or more of the scanning frequency and the tag calibration signal.

In further embodiments, the operational mode 20 may further comprise an initiation stage 21. In the initiation stage 21, the target tag may (be configured to) emit a listener beacon signal request signal. In particular, in embodiments (of the system), the plurality of listener nodes 110 are configured to emit listener beacon signals upon receiving the listener beacon signal request signal. Hence, the listener beacon signal request signal is configured to control the plurality of listener nodes to emit the listener beacon signals upon receiving the listener beacon signal request signal The system operational mode 200 may comprise a beacon detection stage 201 and a localization stage 202. In the beacon detection stage 201, each of the plurality of listener nodes 110 may be configured to detect the target beacon signal and to provide a related target signal to the control system 300. It will be clear to the person skilled in the art, that although all of the listener nodes 110 may be configured to detect the target beacon signal, typically only a first subset of the listener nodes 110 may detect the target beacon signal and typically only a second subset (of the first subset) may report the a related target signal to the control system 300.

In the localization stage 202, the control system 300 may (be configured to) determine a target tag location of the target tag 10 based on the related target signals. In embodiments, the control system 300 may (be configured to) determine the target tag location of the target tag 10 based on the related target signals and one or more of listener location data and/or map data.

FIG. 2 further schematically depicts a method for calibrating a target tag 10, wherein the target tag 10 is configured to detect listener beacon signals emitted by a plurality of listener nodes 110. The method comprises: a detection stage 22 comprising detecting the listener beacon signals with the target tag 10 and determining related listener beacon signal strengths; a signal processing stage 23 comprising determining a tag transmission power based on the related listener beacon signal strengths, the transmission power-related data, the receiver sensitivity-related data, and a predetermined goal number of reached listener nodes; and an execution stage 24 comprising emitting a target beacon signal with the target tag 10 at the tag transmission power.

Figure 3:
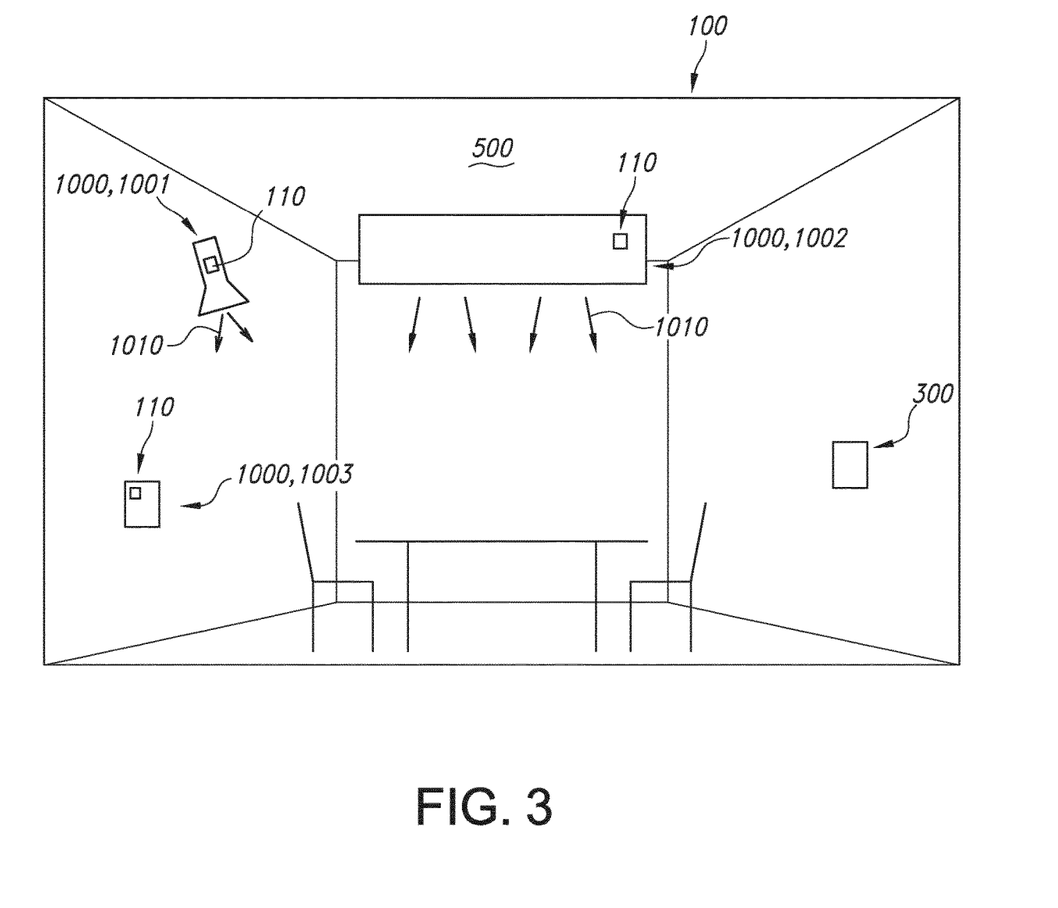
FIG. 3 schematically depicts a further embodiment of the asset-tracking system.

FIG. 3 schematically depicts another embodiment of the asset-tracking system 100, wherein (at least part of a total number of) the plurality of listener nodes 110 are integrated in lighting devices 1000. In particular, FIG. 3 schematically depicts lighting devices 1000 comprising light generating devices, such as a lamp 1001, and a luminaire 1002, and a lighting control element 1003, such as a user interface, like a graphical user interface. Reference 1010 indicates the light that is generated by a lighting device 1000. Especially, this light is visible light, such as white light. The lighting control element 1003 may also be a portable device, such as an I-phone or Smartphone.

FIG. 3 also schematically depicts an embodiment of the lighting device 1000, wherein the lighting device 1000 comprises at least one of the listener nodes 110 of the invention for use in the asset-tracking system 100 of the invention.

The term "plurality" refers to two or more. Furthermore, the terms "a plurality of" and "a number of" may be used interchangeably.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%. Moreover, the terms "about" and "approximately" may also relate to 90% or higher, such as 95% or higher, especially 99% or higher, even more especially 99.5% or higher, including 100%. For numerical values it is to be understood that the terms "substantially", "essentially", "about", and "approximately" may also relate to the range of 90%-110%, such as 95%-105%, especially 99%-101% of the values(s) it refers to.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

The term "further embodiment" and similar terms may refer to an embodiment comprising the features of the previously discussed embodiment, but may also refer to an alternative embodiment.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", "include", "including", "contain", "containing" and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The term "controlling" and similar terms herein especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system. The control system and the element may thus at least temporarily, or permanently, functionally be coupled. The element may comprise the control system. In embodiments, the control system and the element may not be physically coupled. Control can be done via wired and/or wireless control. The term "control system" may also refer to a plurality of different control systems, which especially are functionally coupled, and of which e.g. one control system may be a control system and one or more others may be slave control systems.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings. Moreover, if a method or an embodiment of the method is described being executed in a device, apparatus, or system, it will be understood that the device, apparatus, or system is suitable for or configured for (executing) the method or the embodiment of the method, respectively.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

Amongst others, the invention involves a target tag configured to adjust the transmission power of its target beacon signal in view of a desired number of listener nodes that detect the target beacon signal and report a related signal to a control system. For this, the target tag may determine the signal loss that occurs as listener beacon signals, emitted from the listener nodes, travel to the target tag, and may adjust its transmission power, accordingly, also considering the transmission power and sensitivity of the listener nodes.

The invention claimed is:

1. A target tag for object tracking, wherein the target tag is configured to detect listener beacon signals emitted by a plurality of listener nodes, wherein the listener beacon signals comprise one or more of transmission power-related data and receiver sensitivity-related data of the plurality of listener nodes; wherein the target tag has access to said transmission power-related data and said receiver sensitivity-related data of the plurality of listener nodes, and wherein in a tag operational mode the target tag is configured to:

detect the listener beacon signals and to determine related listener beacon signal strengths and one or more of the transmission power-related data and the receiver sensitivity-related data;

determine a tag transmission power based on the related listener beacon signal strengths, the transmission power-related data, the receiver sensitivity-related data, and a predetermined goal number of reached listener nodes, wherein the predetermined goal number of reached listener nodes includes an upper goal number, wherein for each listener node of the plurality of listener nodes, the target tag determines a receiver sensitivity $R_i$ based on the receiver sensitivity-related data, a listener transmission power $L_i$ based on the transmission power-related data, and a signal strength $S_i$ based on the related listener beacon signal strengths, and wherein the target tag is configured to determine the tag transmission power $T_t$ such that for less than or equal to the upper goal number of the plurality of listener nodes applies that $T_t \geq R_i + L_i - S_i$; and emit the target beacon signal at the tag transmission power.

2. The target tag according to claim 1, wherein the predetermined goal number of reached listener nodes comprises a lower goal number, wherein the target tag is configured to determine the transmission power $T_t$ such that for more than or equal to the lower goal number of listener nodes of the plurality of listener nodes applies that $T_t \geq R_i + L_i - S_i$.

3. The target tag according to claim 1, wherein the target tag is configured to minimize the transmission power $T_t$.

4. The target tag according to claim 1, wherein in the tag operational mode the target tag is configured to determine the predetermined goal number of reached listener nodes based on a predetermined signal quality requirement.

5. The target tag according to claim 2, wherein the lower goal number is at least 3.

6. The target tag according to claim 1, wherein the target tag is configured to:

execute the tag operational mode according to a scanning frequency, wherein the scanning frequency is based on one or more of movement, battery life, and a predefined period; or execute the tag operational mode upon receiving a tag calibration signal.

7. The target tag according to claim 1, wherein in the tag operational mode the target tag is configured to:

emit a listener beacon signal request signal;

wherein the listener beacon signal request signal is configured to control the plurality of listener nodes to emit the listener beacon signals upon receiving the listener beacon signal request signal.

8. An asset-tracking system comprising a target tag according to claim 1, wherein the asset-tracking system comprises said plurality of listener nodes and a control system, and wherein the plurality of listener nodes are configured to emit listener beacon signals, and wherein in a system operational mode:

each of the plurality of listener nodes is configured to detect the target beacon signal and to provide a related target signal to the control system; and the control system is configured to determine a target tag location of the target tag based on the related target signals.

9. The asset-tracking system according to claim 8, wherein the control system is configured to send a tag calibration signal, wherein the target tag is configured to execute the tag operational mode upon receiving the tag calibration signal.

10. The asset-tracking system according to claim 8, wherein at least part of a total number of the plurality of listener nodes are integrated in lighting devices.

11. A method for calibrating a target tag, wherein the target tag is configured to detect listener beacon signals emitted by a plurality of listener nodes, wherein the listener beacon signals comprise one or more of transmission power-related data and receiver sensitivity-related data of the plurality of listener nodes; wherein the method comprises:

detecting the listener beacon signals with the target tag and determining related listener beacon signal strengths and one or more of the transmission power-related data and the receiver sensitivity-related data;

for each listener node of the plurality of listener nodes, determining a receiver sensitivity $R_i$ based on the receiver sensitivity-related data, a listener transmission power $L_i$ based on the transmission power-related data, and a signal strength $S_i$ based on the related listener beacon signal strengths;

determining a tag transmission power $T_t$ based on the related listener beacon signal strengths, the transmission power-related data, the receiver sensitivity-related data, and a predetermined goal number of reached listener nodes, wherein the predetermined goal number of reached listener nodes includes an upper goal number such that for less than or equal to the upper goal number of the plurality of listener nodes applies that $T_t \geq R_i + L_i - S_i$; and emitting a target beacon signal with the target tag at the tag transmission power.

12. A non-transitory computer-readable medium on which are stored a plurality of non-transitory computer-readable instructions that when executed on a processor are configured to perform steps comprising the method of claim 11.

* * * * *